US012224075B2

(12) United States Patent
Agafonov et al.

(10) Patent No.: US 12,224,075 B2
(45) Date of Patent: Feb. 11, 2025

(54) METHOD OF IMPROVING THE EXPLOSION SAFETY OF NUCLEAR POWER PLANTS

(71) Applicant: State Atomic Energy Corporation "ROSATOM" Acts on Behalf of the Russian Federation, Moscow (RU)

(72) Inventors: Gennadij Leonidovich Agafonov, Moscow (RU); Sergej Pavlovich Medvedev, Moscow (RU); Viktor Nikolaevich Mikhalkin, Pushkino (RU); Andrei Aleksandrovich Nekrasov, Moscow (RU); Vyacheslav Aleksandrovich Petukhov, Moscow (RU); Yurij Vasilevich Petrushevich, Moscow (RU); Andrej Nikonovich Starostin, Moscow (RU); Mikhail Dmitrievich Taran, Mikhailovo-Yartsevskoe (RU); Sergej Viktorovich Khomik, Moscow (RU)

(73) Assignee: State Atomic Energy Corporation "ROSATOM" Acts on Behalf of the Russian Federation, Moscow (RU)

( * ) Notice: Subject to any disclaimer, the term of this patent is extended or adjusted under 35 U.S.C. 154(b) by 513 days.

(21) Appl. No.: 17/770,589

(22) PCT Filed: Oct. 5, 2020

(86) PCT No.: PCT/RU2020/000513
§ 371 (c)(1),
(2) Date: Apr. 20, 2022

(87) PCT Pub. No.: WO2021/080461
PCT Pub. Date: Apr. 29, 2021

(65) Prior Publication Data
US 2022/0375639 A1 Nov. 24, 2022

(30) Foreign Application Priority Data
Oct. 24, 2019 (RU) ........................... RU2019134276

(51) Int. Cl.
*G21D 1/02* (2006.01)
*F42D 5/045* (2006.01)

(52) U.S. Cl.
CPC ............... *G21D 1/02* (2013.01); *F42D 5/045* (2013.01)

(58) Field of Classification Search
CPC .................................. F42D 5/05; F42D 5/045
(Continued)

(56) References Cited

U.S. PATENT DOCUMENTS 4,228,132 A 10/1980 Weems
2006/0027419 A1 2/2006 Ponomarev
2008/0257137 A1* 10/2008 James ..................... F42D 5/045 102/303

FOREIGN PATENT DOCUMENTS

CN 106659919 A * 5/2017 ............... A62C 3/04
CN 110100288 A * 8/2019 ........... G21C 13/022
(Continued)

OTHER PUBLICATIONS

CN 106659919 A and Translation.*
(Continued)

*Primary Examiner* — Reginald S Tillman, Jr.
(74) *Attorney, Agent, or Firm* — Dentons US LLP

(57) ABSTRACT

The invention relates to methods of decreasing the effect of blast loads on industrial spaces relating to, inter alia, nuclear power plant and large chemical manufacturing facilities. A method of improving explosion safety in closed spaces by attenuating the effect of a combustion wave or shock wave on a protected surface consists in placing obstructions before the protected surface in the form of elastic membranes filled
(Continued)

with a flame-retardant substance. A non-flammable gas is used as the substance filling the membranes; the membranes themselves are made of a material that disintegrates during, and under the action of, displacement of the front of a combustion wave or shock wave along the surface of the membranes. The membranes are filled with a non-flammable gas immediately after flammable gas is detected at a dangerous concentration in the space in front of the protected object. The technical result consists in increasing explosion safety, decreasing the effect that an explosive wave formed in an accidental explosion of fuel-air mixtures has on the walls and floors of protected spaces.

7 Claims, 2 Drawing Sheets

(58) Field of Classification Search
USPC .......................................................... 102/303
See application file for complete search history.

(56) References Cited

FOREIGN PATENT DOCUMENTS

| | | | | |
|---|---|---|---|---|
| DE | 102008014629 A1 * | 10/2009 | ............... | E04H 9/10 |
| RU | 2125232 | 1/1999 | | |
| RU | 2167304 | 5/2001 | | |
| RU | 46347 | 6/2005 | | |
| RU | 2670430 | 10/2018 | | |
| WO | WO2005/057126 | 6/2005 | | |
| WO | WO-2005090898 A1 * | 9/2005 | ............. | F42D 5/045 |

OTHER PUBLICATIONS

CN 110100288 A and Translation.*
DE 102008014629 A1 and Translation.*
Europe Supplementary Search Report dated Oct. 17, 2022 for Application 20879638.3 filed Oct. 5, 2020 (7 pages).
International Search Report and Written Opinion dated May 13, 2021 for International Application PCT/RU2020/000513 filed Oct. 5, 2020 (5 pages).

* cited by examiner

METHOD OF IMPROVING THE EXPLOSION SAFETY OF NUCLEAR POWER PLANTS

This patent application claims a benefit of priority to PCT International Application PCT/RU2020/000513 filed 5 Oct. 2020; which claims a benefit of priority to Russian Patent Application RU2019134276 filed 24 Oct. 2019; each of which is herein incorporated by reference in its entirety for all purposes.

The invention relates to methods of decreasing the effect of blast loads on industrial spaces relating to, inter alia, nuclear power plant and large chemical manufacturing facilities.

Methods and devices for mitigating a shock wave using foam or porous materials but without use of any additional damping mechanisms are known [1. V. M. Kudinov, B. I. Palamarchuk, B. Ye. Gelfand, S. A. Gubin Shock wave parameters during explosive charge explosion in foam// "Reports of the Academy of Sciences of the USSR". Vol. 228, 1974, 4. —P. 555-558. 2. B. Ye. Gelfand, A. V. Gubanov, Ye. I. Timofeev Interaction of shock air waves with a porous screen//"Izvestiya of the Academy of Sciences of the USSR, MZhG", 1983, 4. —P. 79-84.].

However, such devices are characterized by low efficiency and high consumption of consumables, which significantly limits the possibilities of their practical application.

In order to reduce the intensity of shock waves, screens from a porous material with an open cell structure (for example, polyurethane foam) filled with a non-flammable liquid are also used [RU 2150669, F 42 V 33/00, F 42 D 5/04, 15 Mar. 1999.].

However, the use of such an approach in industrial spaces is not effective, since the presence of liquid in the porous screen leads to formation of high humidity and, accordingly, corrosion, as well as to an increased weight load on the walls and floors of the protected room.

The closest method to the claimed invention in terms of the purpose and the set of essential features is a method of increasing explosion safety, the method comprising placing obstructions in front of the protected surface, in the form of elastic membranes filled with a flame-retardant liquid, the obstructions are dedicated for attenuating the blast wave. This method is considered as a prototype [RU 2125232, F 42 V 39/00, F 42 V 33/00, 23 Sep. 1997].

The disadvantage of the prototype, as well as of other analogues, is the constant static load on the walls and floors of the protected space.

The objective of the claimed invention is to improve explosion safety.

The technical result of the present invention is decrease in the effect that an explosive wave formed in an accidental explosion of fuel-air mixtures has on the walls and floors of protected spaces.

In order to achieve the said technical result, the known method improving explosion safety by attenuating the effect of a combustion wave or shock wave on a protected surface, comprising placing obstructions before the protected surface in the form of elastic membranes filled with a flame-retardant substance it is proposed to use non-flammable gas as a substance filling the membranes, to make the membranes themselves of a material that disintegrates during, and under the action of, displacement of the front of a combustion wave or shock wave along the surface of the membranes, wherein the membranes are filled with a non-flammable gas immediately after flammable gas is detected at a dangerous concentration in the space in front of the protected object. Helium is used to fill the elastic membranes as anon-flammable substance. The elastic membranes are placed in front of the protected surface in at least two layers. Each subsequent layer of the elastic membranes is located in depressions of the previous one. To fill the elastic membranes, an air/helium mixture with a helium content of at least 50 vol. % is used as a non-flammable substance. Membranes filled with air are placed in front of the membranes filled with helium. The total thickness of the elastic membranes filled with non-flammable substance along the normal to the protected surface exceeds two critical detonation diameters in the free space for the mixture of stoichiometric composition.

The disclosed set of features allows to achieve high efficiency of the method of reducing highly explosive and thermal effect of a blast wave on spatially extended flat and curved surfaces, which limit the protected space.

No combination of essential features corresponding to the claimed features was found in the known methods of reducing the explosive impact on the protected surfaces.

The proposed method for attenuating the effect of a blast wave on the protected surface is explained on FIG. 1 and FIG. 2.

Figure 1:
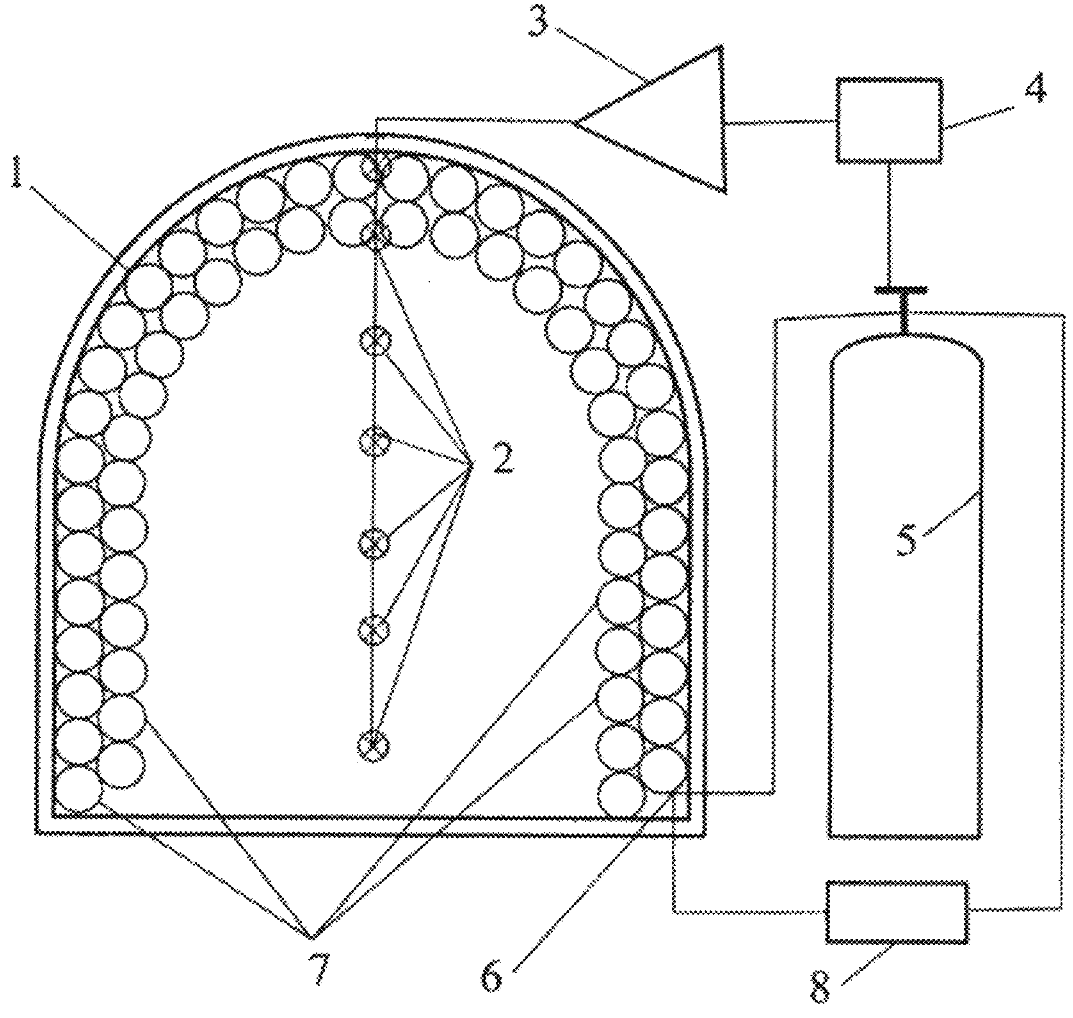
FIG. 1 shows one possible embodiment of the claimed method.

According to FIG. 1, sensors 2 for determining the concentration of explosive gas; a controller 3 actuating, if necessary, the gas supply mechanism 4; cylinders for storing compressed gases 5; a gas distribution system 6; elastic membranes 7 and a compressor 8 are arranged in the protected room 1.

The surfaces of NPP spaces are protected from blast loads as follows. Signals related to the concentration of flammable gas, for example, hydrogen, in the protected room of the NPP, are continuously sent from the sensors 2 to the controller 3. When the controller 3 detects an unacceptable concentration of flammable gas (in the event of an emergency), the controller 3 issues a command to the gas supply mechanism 4, and the elastic membranes 7 are filled with non-flammable gas, for example helium, through the distribution system 6 from the containers 5 (on FIG. 1, two layers of the membranes are filled with non-flammable gas). If the flammable gas concentration in the space 1 can be decreased to a safe level (for example, because of operation of the ventilation system and the system of the flammable gas chemical oxidation, not shown on the Figures), the gas from the membranes 7 can be pumped using the corresponding compressors back to the containers 5 for subsequent use. Thus, the explosive load protection system of the spaces, using elastic membranes with non-flammable (inert) gas, can be returned to the original operating state. If explosive combustion occurs in the space 1, the combustion wave (or shock wave), approaching the elastic membranes 7, disintegrates them, and continues its displacement in the environment of non-flammable (inert) gas, which leads to a decrease in its force action on the walls and, in particular, on the dome of the space 1.

Figure 2:
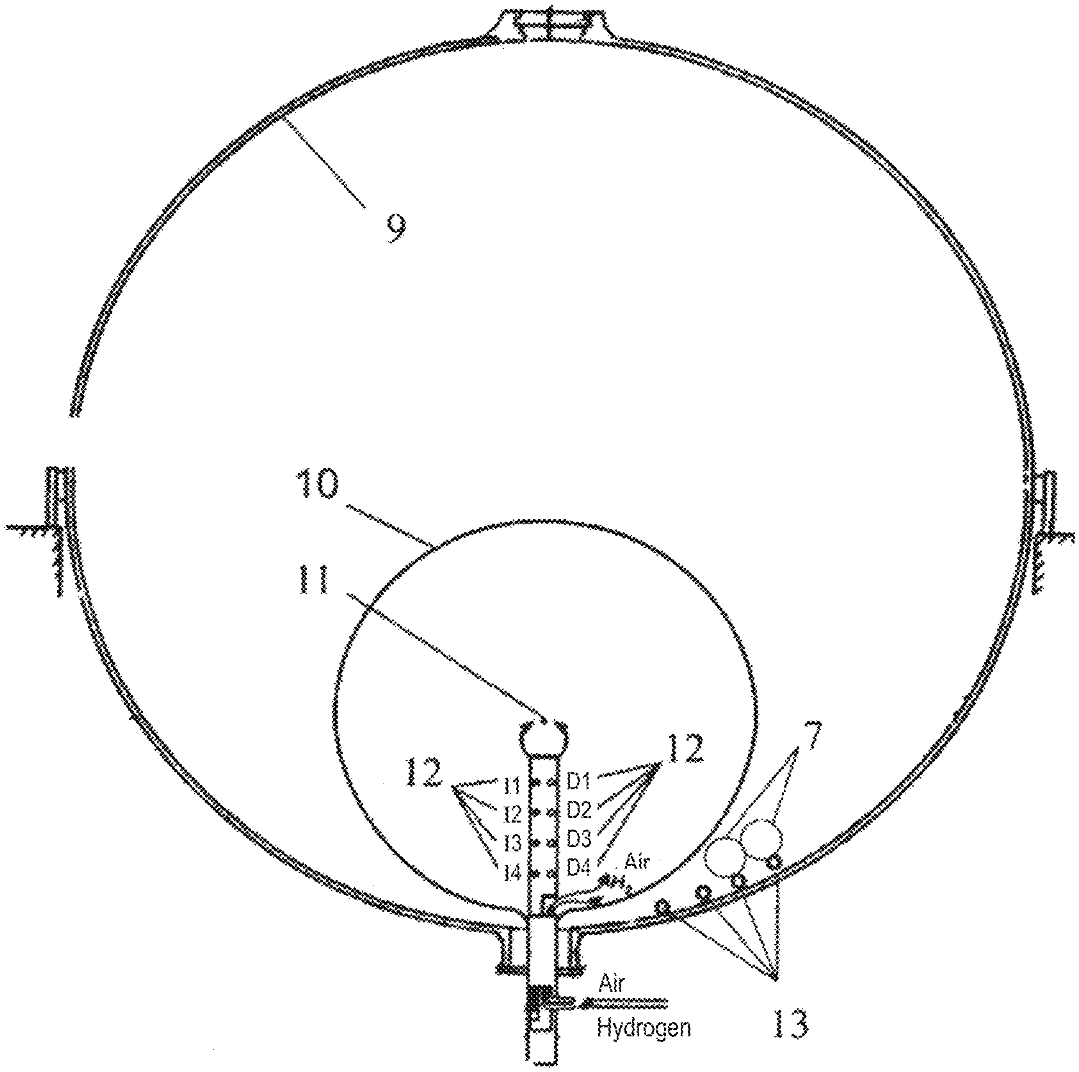
FIG. 2 shows a schematic diagram of an explosion chamber where the effectiveness of shock wave attenuation was experimentally tested.

The effectiveness of shock wave attenuation was tested in the experiments with a large-scale explosion of a local volume of a hydrogen-air mixture in a spherical explosion chamber 9 with a diameter of 12 m, which schematic is shown on FIG. 2. The pre-mixed flammable mixture was pumped into a latex membrane 10 (balloon probe) with a volume of up to 40 $m^3$. The combustion or detonation was initiated in the center by a charge of condensed explosive 11. Pressure sensors 12 $D_{1-4}$ and ionization sensors 12 $I_{1-4}$ were located inside the membrane and partially outside of it.

In relation to external objects, which in the simplest case are represented by limiting surfaces, the spherical volume 10 located in the near-wall area simulates the accumulation of a flammable hydrogen-air mixture in the internal space of the nuclear power plant. For recording the explosive load parameters, four pressure sensors 13 were located near the surface of the explosion chamber, shown in the right-hand part of the layout on FIG. 2. As pressure sensors 13, sensors of RSV113 model were used, which were mounted flush to a steel plate of 6 mm thickness and of 0.52×0.65 $m^2$ surface area (not shown on the Figure). Elastic membranes 7 filled with helium or air and having a gas layer thickness of 0.6 m, or filled with a two-layer air-helium gas system with the same total gas layer thickness of 0.6 m and with a layer thickness ratio of 1:1, were installed on a part of the sensors 13. In the experiments, the pressure recorded by the sensors 13 was compared for two variants—with and without local protection membranes 7, as shown on FIG. 2.

Differential pressure comparison table

| Sensor in the plate not covered with inertizer, ΔP, bar | Sensor in the plate covered with inertizer, | |
|---|---|---|
| | Type and thickness of inertizer layer | ΔP, bar |
| 35-40 | air, 0.6 m | 14.9 |
| | helium, 0.6 m | 4.7 |
| | air-helium 0.6 m (1/1) | 5.4 |

These tests have shown that elastic membranes filled with helium provide the most effective pressure decrease.

The specified gas layer thickness of 0.6 m in the elastic membranes on the blast wave propagation path is at least double critical detonation diameter in the free space for a hydrogen-air mixture with stoichiometric composition.

The invention claimed is:

1. The invention method of improving explosion safety in closed spaces by attenuating the effect of a combustion wave or shock wave on a protected surface, comprising placing obstructions before the protected surface in the form of elastic membranes filled with a flame-retardant substance, characterized in that a non-flammable gas is used as the substance filling the membranes; the membranes themselves are made of a material that disintegrates during, and under the action of, displacement of the front of a combustion wave or shock wave along the surface of the membranes, wherein the membranes are filled with a non-flammable gas immediately after flammable gas is detected at a dangerous concentration in the space in front of the protected object.

2. The method of claim 1, wherein helium is used as the non-flammable substance filling the elastic membranes.

3. The method of claim 1, wherein the elastic membranes are placed before the protected surface in at least two layers.

4. The method of claim 3, wherein each subsequent layer of the elastic membranes is located in depressions of the previous one.

5. The method of claim 1, wherein an air/helium mixture with a helium content of at least 50 vol. % is used as the non-flammable substance filling the elastic membranes.

6. The method of claim 2, wherein membranes filled with air are placed before the membranes filled with helium.

7. The method of claim 1, wherein the total thickness of the elastic membranes filled with non-flammable substance along the normal to the protected surface exceeds two critical detonation diameters in the free space for the stoichiometric mixture.

* * * * *